(12) United States Patent
Simske et al.

(10) Patent No.: US 7,466,234 B2
(45) Date of Patent: Dec. 16, 2008

(54) PACKAGE DISTINGUISHING SYSTEM

(75) Inventors: Steven Simske, Fort Collins, CO (US);
Lester Ortiz, Puerto Rico, CA (US);
Malena Mesarina, Mountain View, CA (US); Vinay Deolalikar, Mountain View, CA (US); Cyril Brignone, Mountain View, CA (US); Guillaume Oget, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 11/264,179

(22) Filed: Nov. 1, 2005

(65) Prior Publication Data

US 2007/0096865 A1    May 3, 2007

(51) Int. Cl.
*G08B 13/14* (2006.01)
(52) U.S. Cl. ............. 340/572.1; 340/572.3; 340/572.4; 340/572.8; 340/539.1; 340/568.1; 340/825.69; 340/5.8; 235/385; 235/487

(58) Field of Classification Search ............. 340/572.1, 340/572.3, 572.4, 539.1, 539.12, 539.13, 340/825.69, 5.8, 10.1, 10.3, 10.42, 568.1, 340/5.65, 825.72, 572.8; 235/383, 385, 487, 235/492
See application file for complete search history.

(56) References Cited

U.S. PATENT DOCUMENTS

| | | | | |
|---|---|---|---|---|
| 5,604,485 A | * | 2/1997 | Lauro et al. | 340/572.5 |
| 6,025,780 A | * | 2/2000 | Bowers et al. | 340/572.3 |
| 6,603,318 B2 | * | 8/2003 | Hansen et al. | 324/689 |

* cited by examiner

*Primary Examiner*—Hung T. Nguyen

(57) ABSTRACT

A system for distinguishing a package includes a plurality of identifiers, where at least one of the identifiers is intentionally non-functional. The system also includes an identifier indicator that indicates the identity of the at least one of the identifiers that is intentionally non-functional. In addition, the identifier indicator is stored on at least one of the package and a database and is accessible by a user to authenticate the package.

19 Claims, 5 Drawing Sheets

PACKAGE DISTINGUISHING SYSTEM

CROSS REFERENCE TO RELATED APPLICATION

U.S. patent application Ser. No. 11/125,559, entitled "Seal Method and System for Packages", by Geoff M. Lyon et al., filed May 10, 2005, is related to present application and is incorporated by reference in its entirety.

BACKGROUND

Products sold to customers are often sent through a series of intermediate points between the original source, such as a manufacturer, and the customers, who may buy the products from a retailer. Products may include food items, pharmaceutical drugs or other products, including products of manufacture. These products may be sold to a customer through a grocery store, a pharmacy, a department store or other type of retailer.

Counterfeited products may enter the supply chain to the customer at any number of different points in the supply chain. For example, a wholesaler may receive counterfeit goods which it passes on to a retailer, or directly to the customer.

Because of the possibility of spoofing, wherein a counterfeiter copies the packaging of the product, manufacturers often attempt to prevent entry of counterfeit products into the marketplace by protecting the packages. Some approaches that manufacturers have used to make it difficult for counterfeiters include the use of holograms or three dimensional printing on packages. For example, a hologram of a company's logo is placed on a package so a customer buying the product knows that the product is from the company and is not counterfeit. These approaches provide some deterrence; however, counterfeiting has become very sophisticated so that it is has become more difficult for manufacturers to provide product packaging that cannot be relatively easily replicated by counterfeiters of the product.

SUMMARY

A system for distinguishing a package is disclosed herein. The system includes a plurality of identifiers, where at least one of the identifiers is intentionally non-functional. The system also includes an identifier indicator that indicates the identity of the at least one of the identifiers that is intentionally non-functional. In addition, the identifier indicator is stored on at least one of the package and a database and is accessible by a user to authenticate the package.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

As disclosed herein, a package may be distinguished from spoofed or otherwise counterfeited packages through use of one or more intentionally non-functional identifiers. In addition, the identities of the one or more intentionally non-functional identifiers may be tracked in an identifier indicator. In this regard, the package may be one or both of authenticated and tracked based upon a determination of which of the identifiers are functional and which of the identifiers are non-functional.

Figure 1A:
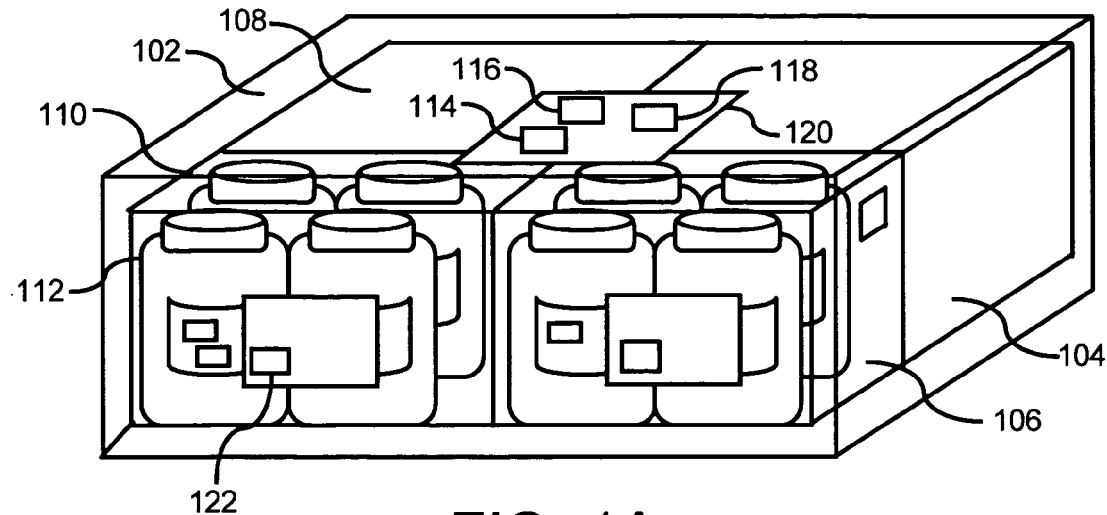
FIG. 1A illustrates a perspective view of a simplified example of a package that may be authenticated according to an embodiment of the invention.

With reference first to FIG. 1A, there is shown a perspective view of a simplified example of a package 100 which may be authenticated according to various examples described herein. The package 100 is generally depicted as including an outer package 102, which may comprise a pallet or other container. A plurality of sub-packages 104-110 are depicted as being located within the outer package 102. In addition, a plurality of items 112 are depicted as being contained within the sub-packages 104-110. In this regard, the package 100 generally represents a container within which products, such as, drugs, food items, or other goods may be transported.

It should be understood that the package 100 represents a generalized illustration and that the package 100, as depicted, should not be construed as limiting examples of the invention in any respect. It should also be understood that various examples described herein may be applied to packages having configurations different than the package 100 depicted in FIG. 1. For instance, various examples of the invention may be applicable to a package 100 that contains fewer elements than those shown in FIG. 1, in which, the package 100 may directly contain the drugs, food items, or other goods in one of the outer package 102, the sub-packages 104-110, or the item 112 without use of the other containers.

The package 100 may include a package indicator 114, such as, a serial number, a UPC, an RFID tag, etc., that may be used to substantially uniquely identify the package 100. The package 100 may also include a system for distinguishing the package 100, where the system includes identifiers 116, 118 that may be used to substantially distinguish the package 100 from spoofed or otherwise counterfeited packages or products. In other words, the identifiers 116, 118 may be used to enable one or both of authentication and tracking of the package 100. In this regard, one or more of the identifiers 116, 118 may store information pertaining to the package 100 or the contents of the package 100. In addition, the identifiers 116, 118 may store the information in various modalities, for instance, a radio frequency identification (RFID) device, a printed circuit, a bar code, a printed ink (such as, ultra-violet, fluorescent, infrared, etc.), and the like.

Although the package indicator 114 and the identifiers 116, 118 have been illustrated as being placed on a label 120 of the package 100, one or more of the package indicator 114 and the identifiers 116, 118 may be placed on various other locations of the package 100 without departing from a scope of the package 100. In addition, although two identifiers 116, 118 have been illustrated on the package 100, it should be understood that any reasonably suitable number of identifiers 116, 118 may be employed to distinguish the package 100. Moreover, it should be understood that one or more of the sub-packages 104-110 and the items 112 may also include package indicators 114 as well as identifiers 116, 118.

As described in greater detail herein below, one or more of the identifiers 116, 118 may intentionally be made to be non-functional or otherwise inactive. One or more of the identifiers 116, 118 may be made to be non-functional to make it relatively more difficult for the package 100 to be spoofed or otherwise counterfeited. More particularly, for instance, in addition to copying the package 100, a counterfeiter must also be able to determine which of the identifiers 116, 118 is non-functional to accurately copy the package 100. This requirement adds a relatively significant hurdle for a counterfeiter in attempting to accurately duplicate the package 100. As such, the selection of which of the identifiers 116, 118 are non-functional is another variable in distinguishing the package 100 from spoofed or otherwise counterfeited packages or goods.

The manner in which an identifier 116, 118 may intentionally be made to be non-functional or otherwise inactive may depend upon the identifier 116, 118 itself. For instance, if the identifier 116, 118 comprises a barcode, the identifier 116, 118 may be rendered non-functional by making the barcode represent nonsensical data. As another example, if the identifier 116, 118 comprises an RFID device or a printed circuit, the identifier 116, 118 may be rendered non-functional by causing the identifier 116, 118 to return no information or false information. As a further example, if the identifier 116, 118 comprises a printed ink, the identifier 116, 118 may be rendered non-functional by omitting or adding a chemical reagent to thereby cause a reading of the ink to be inaccurate or missed entirely.

Figure 2:
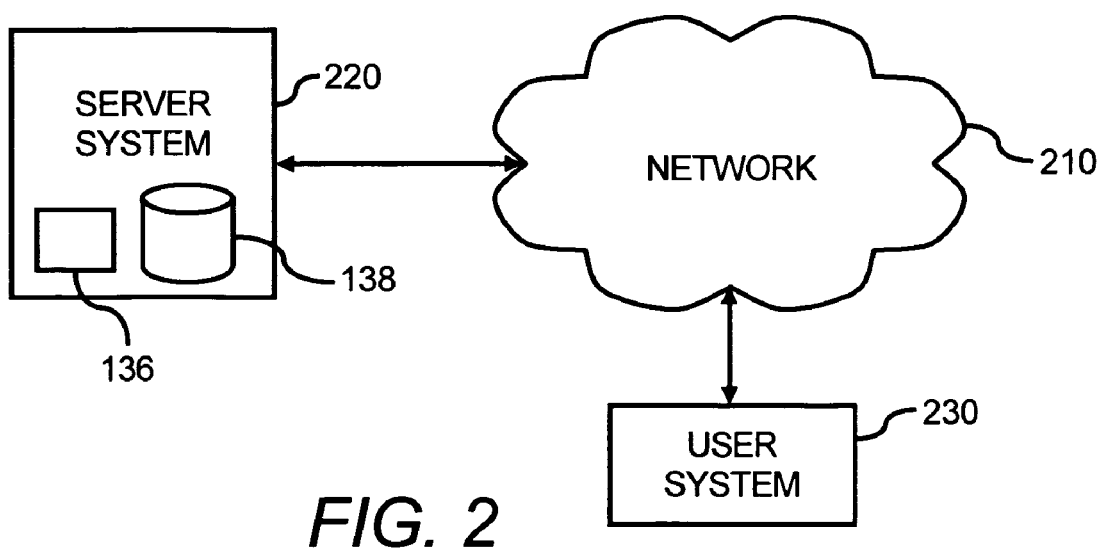
FIG. 2 illustrates a simplified example of a system through which the authenticity of a package may be determined, according to an embodiment of the invention.

The identification of the one or more identifiers 116, 118 that are intentionally non-functional may be tracked as an identifier indicator for use in authenticating or tracking the package 100. In one example, the identification of the intentionally non-functional one or more identifiers 116, 118 may be tracked through storage of the identifier indicator in a server system 220 (FIG. 2). A more detailed description of this example is set forth herein below with respect to FIG. 2.

In a second example, an identifier indicator 122 configured to indicate the identities of the intentionally non-functional one or more identifiers 116, 118 may be included on the package 100 itself. This identifier indicator 122 may, for instance, be printed in coded format on the package 100. By way of example, a patch containing a number of colors may be printed on the package 100, where one or more of the colors printed, the arrangement of the colors, the color sequence, etc., provides an indication of which of the identifiers 116, 118 is non-functional. As another example, the location of the identifier indicator 122 on the package 100 may also or alternatively provide an indication as to which of the identifiers 116, 118 is non-functional. As a further example, the identifier indicator 122 may comprise computer readable encrypted data configured to be transmitted from the package 100.

According to one example, the identifiers 116, 118 of sub-packages 104-110 or items 112 housed in the outer package 102 may include the same sets of functional and non-functional functional identifiers 116, 118. Under this example, for instance, all of the sub-packages 104-110 may include a functional RFID tag and a non-functional bar code.

According to another example, the identifiers 116, 118 of sub-packages 104-110 or items 112 housed in the outer package 102 may include different sets of functional and non-functional identifiers 116, 118. In this example, for instance, a sub-package 104 may include a functional RFID tag and a non-functional bar code; whereas a sub-package 106 may include a non-functional RFID tag and a functional ink mark. In addition, the identifier indicator 122 may store information pertaining to which of the identifiers 116, 118 associated with the sub-packages 104-110 are functional and which ones are non-functional. In one regard, therefore, the package 100 may be distinguished based upon which of the identifiers 116, 118 of the sub-packages 104-110 are functional and which of the identifiers 116, 118 are not functional.

More particularly, for instance, a record of which of the identifiers 116, 118 associated with the sub-packages 104-110 are functional and which are non-functional may be included in the identifier indicator 122. In addition, the percentage of identifiers 116, 118 that are non-functional may also be included in the identifier indicator 122. As such, a determination of whether the package 100 is authentic may be made through a determination of whether the percentage of non-functioning identifiers 116, 118 associated with a plurality of sub-packages 104-110 is substantially equal to the percentage of intentionally non-functioning identifiers 116, 118 included in the identifier indicator 122.

Figure 1B:
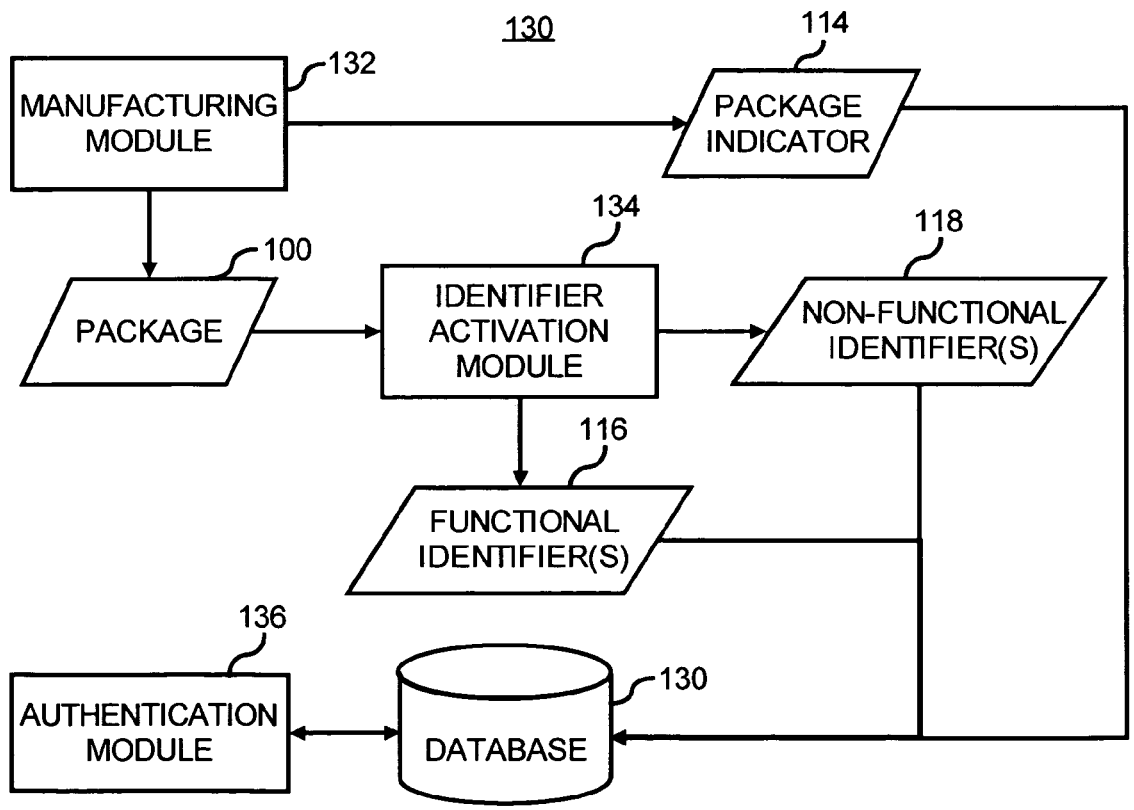
FIG. 1B illustrates a simplified example of data flow in a system for providing a package that may be authenticated according to an embodiment of the invention.

FIG. 1B illustrates a simplified example of data flow in a system 130 for providing a package that may be authenticated according to an example of the invention. It should be understood that the following description of the product providing system 130 is but one manner of a variety of different manners in which such a system 130 may be operated. In addition, it should be understood that the product providing system 130 may include additional components and that some of the components described may be removed and/or modified without departing from a scope of the product providing system 130.

The product providing system 130 is depicted as including a manufacturing module 132, an identifier activation module 134, and an authentication module 136. The package 100 may be manufactured at the manufacturing module 132 to include a plurality of identifiers 116, 118. The identifiers 116, 118 may be introduced onto the package 100 or a label 120 of the package 100 in manners consistent with the types of identifiers 116, 118 used to distinguish the package 100. Thus, for instance, if an identifier 116 comprises an ink mark or a barcode, the identifier 116 may be printed onto the package 100 or the label 120. As another example, if the identifier 116 comprises an RFID tag or a printed circuit, the identifier 116 may be affixed onto the package 100 or the label 120 through use of a suitable adhesive.

As shown in FIG. 1B, the manufacturing module 132 may also assign the package indicator 114 to the package 100. In addition, the manufacturing module 132 may place the package indicator 114 on the package 100.

The product providing system 130 may also include an identifier activation module 134. The identifier activation module 134 may be implemented to select which of the identifiers 116, 118 are to be functional and which of the identifiers 116, 118 are to be non-functional. In performing this function, the identifier activation module 134 may perform the functions of introducing the identifiers 116, 118 to the package 100 as described above with respect to the manufacturing module 132. In addition, the identifier activation module 134 may also track the functional identifiers 116 and the non-functional identifiers 118 as an identifier indicator 122.

The tracking of the functional identifiers 116 and the non-functional identifiers 118 may be performed in a variety of manners. In a first instance, and as shown in FIG. 1B, the identifier indicator 122 may be stored in a database 138, along with the package indicator 114 assigned to that package 100. This correlation may be stored, for instance, in XML language and may be accessible by the authentication module 136 in authenticating a package 100, as described in greater detail herein below with respect to FIG. 1C.

In addition, identifier indicators 122 of a plurality of packages 100, sub-packages 104-110, or items 112, may be stored in the form of a table that indicates which of the identifiers 116, 118 are intentionally inactive, as shown below in Table 1.

TABLE 1

| Package ID | UV | RFID | Microprocessor | Infrared | Bar Code | Forensic |
|---|---|---|---|---|---|---|
| XXX0A | | Inactive | | Inactive | | |
| XXX0B | Inactive | | | | Inactive | |
| XXX0C | | | Inactive | Inactive | | |
| XXX0D | | | | | Inactive | Inactive |

As shown in Table 1, the packages 100, sub-packages 104-110, or items 112, may include a plurality of identifiers 116, 118. In addition, the table may include a correlation between the package indicators 114 and the identifiers 116, 118. As shown, the identifiers 116, 118 that have been made to be intentionally non-functional are labeled as "inactive".

In another example, however, the identifier indicator 122 may be included on the package 100 or the label 120 itself. As described above, this information may be printed or otherwise stored on the package 100 or the label 120.

Figure 1C:
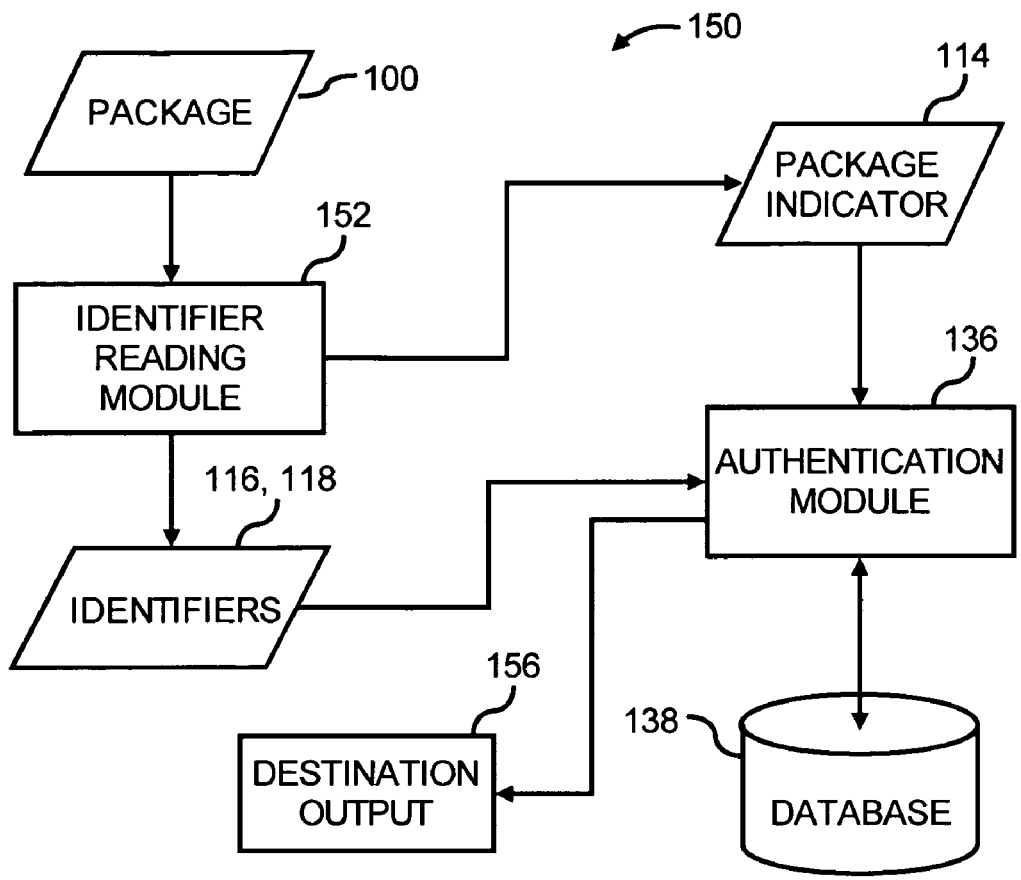
FIG. 1C shows a simplified example of data flow in a system for determining the authenticity of packages, according to an embodiment of the invention.

With reference now to FIG. 1C, there is shown a simplified example of data flow in a system 150 for determining the authenticity of packages, according to an example. It should be understood that the following description of the authenticity determining system 150 is but one manner of a variety of different manners in which such a system 150 may be operated. In addition, it should be understood that the authenticity determining system 150 may include additional components and that some of the components described may be removed and/or modified without departing from a scope of the authenticity determining system 150.

Generally speaking, the authenticity determining system 150 may be implemented to determine whether a package 100 is authentic based upon which of the identifiers 116, 118 are functional and which of the identifiers 116, 118 are non-functional. As shown, the authenticity determining system 150 may include an identifier reading module 152 configured to read the identifiers 116, 118. The identifier reading module 152 may comprise any reasonably suitable reading device configured to read or receive information from the identifiers 116, 118.

The identifier reading module 152 may also be configured to transmit the read identifiers 116, 118 to the authentication module 136. In this regard, the identifier reading module 152 may form part of the user system 230 shown in FIG. 2. In addition, the authentication module 136 may be stored as part of the server system 220. The identifier reading module 152 may be further configured to read and transmit the package indicator 114 to the authentication module 136.

The authentication module 136 may determine which of the identifiers 116, 118 are functional and which are non-functional. By way of example, if the identifier reading module 152 obtains information from an identifier 116, 118, the authentication module 136 may determine that the identifier 116, 118 is functional. On the other hand, if the identifier reading module 152 does not obtain information from an identifier 116, 118, the authentication module 136 may determine that the identifier 116, 118 is non-functional. In another example, if the information read by the identifier reading module 152 is incorrect or otherwise improper, the authentication module 136 may also determine that the identifier 116, 118 is non-functional.

The authentication module 136 may also compare the identities of the functional and non-functional identifiers 116, 118 to information stored in the database 138. In performing this comparison, the authentication module 136 may access an entry in a table stored in the database 138 based upon the identity of the package 100 as derived from the package indicator 114.

If the identities of the functional and non-functional identifiers 116, 118 substantially match the identities of the functional and non-functional identifiers 116, 118 listed in the table, the authentication module 136 may output an indication to a destination output 156, such as, a user computer 230, that the package 100 may be authentic. However, if the identities of the functional and non-functional identifiers 116, 118 substantially differ from the identities of the functional and non-functional identifiers 116, 118, the authentication module 136 may output an indication that the package 100 may be in authentic.

Communications from the authentication module 136 and the destination output 156 may be performed through facsimile, email, web pages viewable in a web browser, etc. In addition, the authentication module 136 may store date and time information regarding the inquiry as to whether the package 100 is authentic, as well as whether the package 100 was found to be authentic. This information may be stored in the database 138 and may be used, for instance, for tracking purposes.

According to another example, where the identities of the functional and non-functional identifiers 116, 118 are included on the package 100 or label 120, various operations of the authentication module 136 may be performed locally to the package 100. More particularly, for instance, the authentication module 136 may be stored at the user system 230. In this regard, the identifier reading module 152 may read the identifier indicator 122 as well as the identifiers 116, 118. In addition, the authentication module 136 may interpret the identifier indicator 122 to determine which of the identifiers 116, 118 are supposed to be functional and which of the identifiers 116, 118 are supposed to be non-functional.

The authentication module 136 may compare this information with a determination of which of the identifiers 116, 118 are functional and non-functional to determine whether the package 100 is authentic, as described above. In addition, the authentication module 136 may output an indication as to whether the package 100 is authentic on the user system 230.

With reference now to FIG. 2, there is shown a simplified example of a system 200 through which the authenticity of a package 100 may be determined. The system 200 includes a network 210, a server system 220 and a user system 230. The server system 220 and the user system 230 may include any reasonably suitable type of computer system, such as the computer system described herein below with reference to FIG. 6. The server system 220 may include a network interface including software and/or hardware, and serving software (not shown) for communicating with other systems connected to the server system 220 through the network 210. The network 210 may include any type of network, including a LAN, a WAN, the Internet, etc.

The server system 220 may include the authentication module 136 and the database 138. The user system 230 may include, for instance, the identifier reading module 152 and the destination output 156. As such, for instance, the user system 230 may be used to submit identifier 116, 118 information to the server system 220 through a website administered by the server system 220.

The server system 220 may implement the authentication module 136 as described above with respect to FIG. 1C. In addition, the server system 220 may transmit a message to the user system 230 indicating that the package 100 is authentic or that the package 100 may not be authentic via the network 210. The message transmitted by the server system 220 may include a message sent to a browser of the user system 230, an email or other type of message, including facsimiles, etc.

The system 200 may be used to authenticate any reasonably suitable type of product at any point of a supply chain 300 (FIG. 3), from the manufacturer to the customer. In addition, or alternatively, packages 100 may be authenticated locally at any point of the supply chain 300 through use, for instance, of identifier indicators 122 as described above with respect to FIG. 1C.

Figure 3:
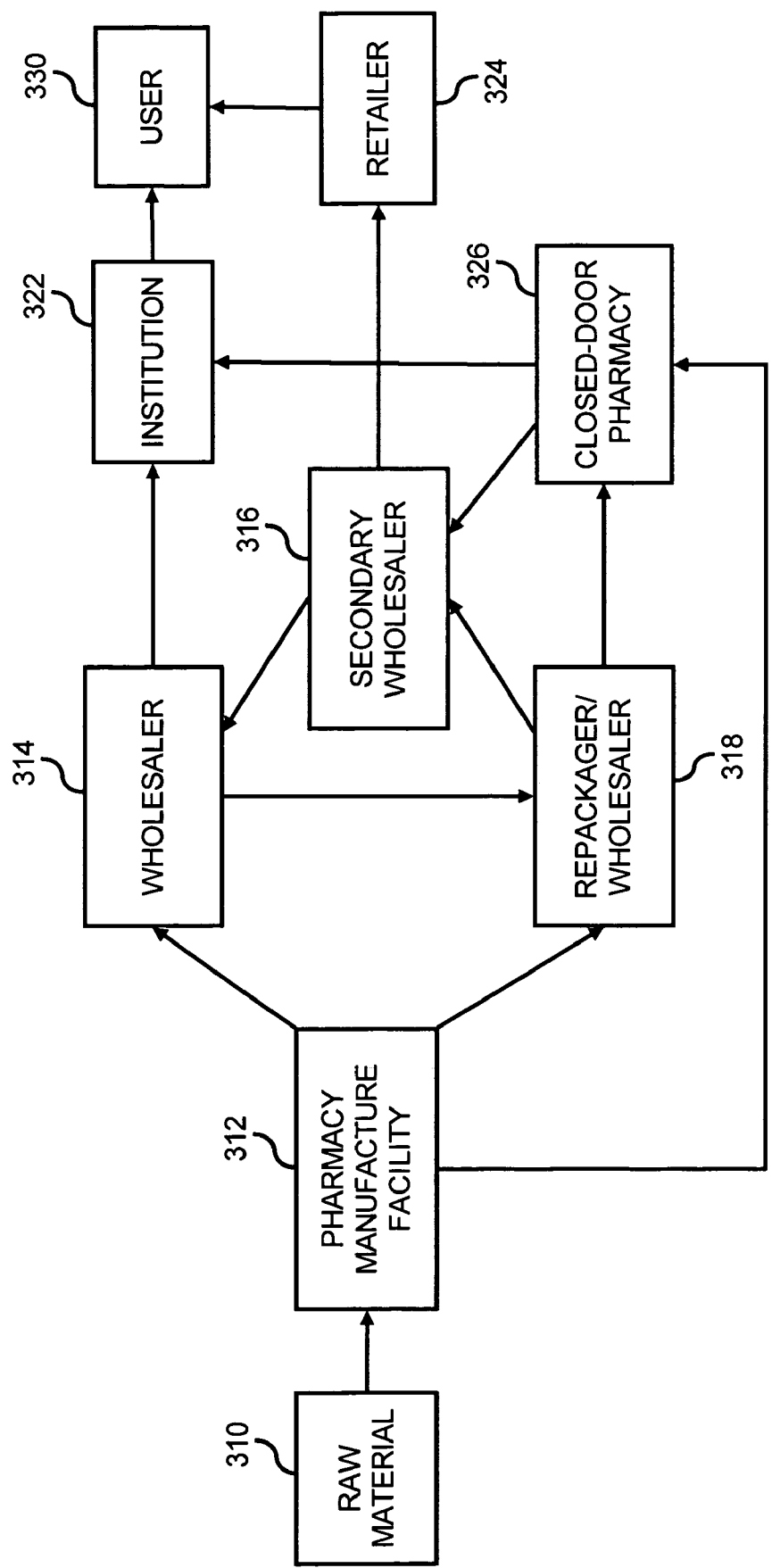
FIG. 3 illustrates a simplified example of supply chain for the sale of pharmaceutical products, according to an embodiment of the invention.

FIG. 3 illustrates a simplified example of a supply chain 300 for the sale of pharmaceutical ("pharma") products. As shown in FIG. 3, raw materials 310 are received by a pharma manufacturing facility ("PMF") 312. The PMF 312 sends the manufactured pharma products to a wholesaler 314 or a repackager/wholesaler 318. The wholesaler 314 may sell the pharma products to institutions 322, such as pharmacies, hospitals, nursing homes or hospices, or retailers 324, which sell the pharma products to individual users 330. The wholesaler 314 may also send some or all of its received pharma products to the repackager/wholesaler 318.

The repackager/wholesaler 318 may sell the pharma products to closed-door pharmacies 326. The closed door pharmacies 326 may sell the pharma products to institutions 322, such as hospitals, nursing homes or hospices. The PMF 312 may also directly provide pharma products to the closed-door pharmacies 326.

Problems with counterfeit goods may arise with a network of secondary wholesalers 316. Some of the pharma products received by the repackager/wholesalers 318 or closed-door pharmacies 326 may end up at the secondary wholesalers 316, who may sell the pharma products at highly discounted prices to retailers 324, such as pharmacies, or wholesalers 314.

Due to the number of entities handling the pharma products as they progress through the supply chain 300, pharmacies 324 and institutions 322 may receive counterfeit pharma products. For example, secondary wholesalers 316 may receive counterfeit products, which the secondary wholesalers 316 may sell to retailers 324 or wholesalers 314, introducing the counterfeit products into the supply chain 300. Counterfeit pharma products may include, for instance, pharma products that have been re-imported into the country from abroad, pharma products that have expired (but the expiry dates have been changed on the packaging), or pharma products not manufactured by the PMF 312 that are packaged in packaging designed to spoof the packaging of the real pharma products.

The embodiments described herein are not limited for use in a pharmaceutical supply chain, and may be used for authenticating any device or item that may store or otherwise include a package identifier.

Figure 4:
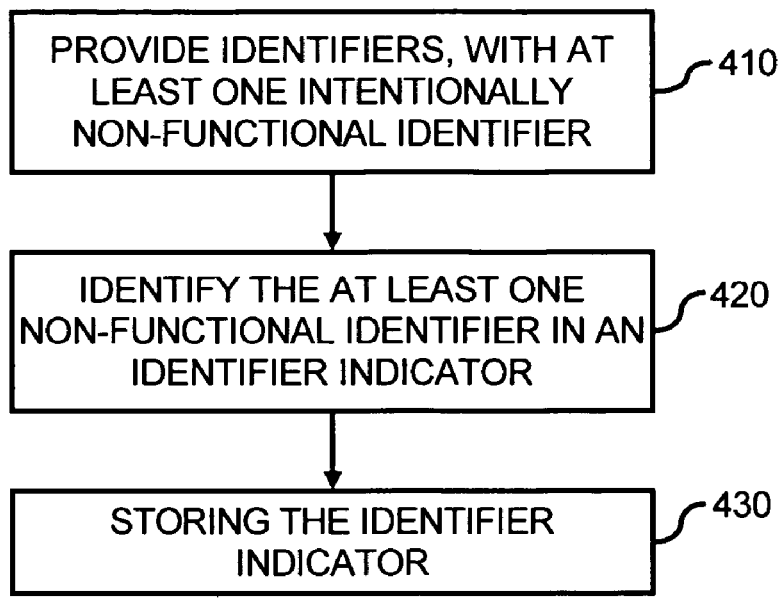
FIG. 4 illustrates a flow diagram of a method for distinguishing a package, according to an embodiment of the invention.

With reference now to FIG. 4, there is shown a flow diagram of a method 400 for distinguishing a package 100 according to an example. It is to be understood that the following description of the method 400 is but one manner of a variety of different manners in which an example of the invention may be practiced. It should also be apparent to those of ordinary skill in the art that the method 400 represents a generalized illustration and that other steps may be added or existing steps may be removed, modified or rearranged without departing from a scope of the method 400.

The description of the method 400 is made with reference to FIGS. 1A, 1B and 2, and thus makes reference to the elements cited therein. It should, however, be understood that the method 400 shown in FIG. 4 is not limited to being implemented by the elements shown in FIGS. 1A, 1B, and 2 and may be implemented by more, less, or different elements as those shown in FIGS. 1A, 1B, and 2.

At step 410, identifiers 116, 118 are provided with respect to the package 100, where at least one of the identifiers 116, 118 is intentionally non-functional, as described in greater detail herein above with respect to FIG. 1B. The at least one of the intentionally non-functional identifiers 116, 118 is identified in an identifier indicator at step 420. In addition, the identifier indicator is stored at step 430.

As also described herein above, the identifier indicator may be stored in a database 138 of a server system 220. In addition or alternatively, the identifier indicator may be stored in a database of the user system 230. As a further example, the identifier indicator may be stored on the package 100, such that the identification of the intentionally non-functional at least one of the identifiers is capable of being determined through information provided from the identifier indicator located on the package 100. Furthermore, as shown in FIG. 1A, the package 100 may include a plurality of sub-packages 104-110, where the sub-packages 104-110 include respective identifiers, at least one of which is intentionally non-functional.

Figure 5:
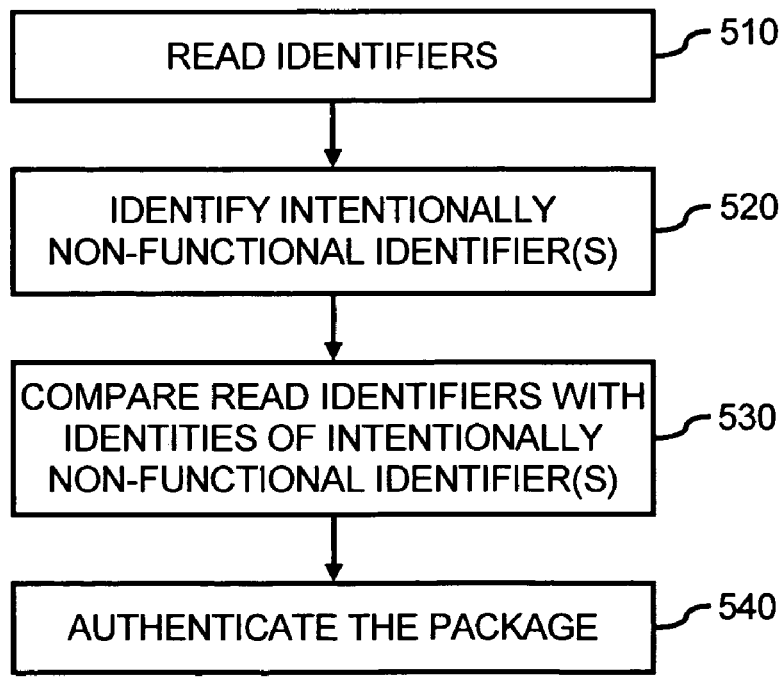
FIG. 5 illustrates a flow diagram of a method for authenticating a package having identifiers, according to an embodiment of the invention.

With reference now to FIG. 5, there is shown a flow diagram of a method 500 for authenticating a package 100 having identifiers 116, 118 according to an example. It is to be understood that the following description of the method 500 is but one manner of a variety of different manners in which an example of the invention may be practiced. It should also be apparent to those of ordinary skill in the art that the method 500 represents a generalized illustration and that other steps may be added or existing steps may be removed, modified or rearranged without departing from a scope of the method 500.

The description of the method 500 is made with reference to FIGS. 1A-1C and 2, and thus makes reference to the elements cited therein. It should, however, be understood that the method 500 shown in FIG. 5 is not limited to being implemented by the elements shown in FIGS. 1A-1C and 2 and may be implemented by more, less, or different elements as those shown in FIGS. 1A-1C and 2.

At step 510, the identifiers 116, 118 of the package 100 may be read. As described above, the identifiers 116, 118 may be read in suitable manners consistent with the types of identifiers 116, 118 included on the package 100. Thus, for instance, if the identifiers 116, 118 include a bar code, the identifiers 116, 118 may be read using a bar code scanner. Likewise, if the identifiers 116, 118 include an RFID tag, the identifiers 116, 118 may be read using an RFID reader.

At step 520, the identities of one or more of the identifiers 116, 118 that are intentionally non-functional may be identified from an identifier indicator. As also described above, the identifier indicator may provide an indication as to which of the identifiers 116, 118 has been made to be intentionally non-functional. In addition, the identifier indicator may be stored in a database or the identifier indicator may be stored on the package 100.

The read identifiers may be compared with the identities of the one or more intentionally non-functional identifiers at step 530. This comparison may be performed, for instance, by an authentication module 136 in a server 220. In addition, or alternatively, the comparison may be performed locally in a user system 230. In any regard, the package 100 may be authenticated based upon the comparison of the read identifiers 116, 118 and the identities of the intentionally non-functional identifiers 116, 118, as indicated at step 540.

Authentication of the package 100 may also include a outputting of whether the package 100 is authentic. More particularly, for instance, an indication that the package 100 may be authentic may be outputted in response to the identity of a non-functioning read identifier 116, 118 substantially matching the identity of an intentionally non-functional identifier 116, 118. In addition, an indication that the package 100 may be in authentic may be outputted in response to the identity of a non-functioning read identifier 116, 118 substantially differing from the identity of an intentionally non-functional identifier 116, 118.

Figure 6:
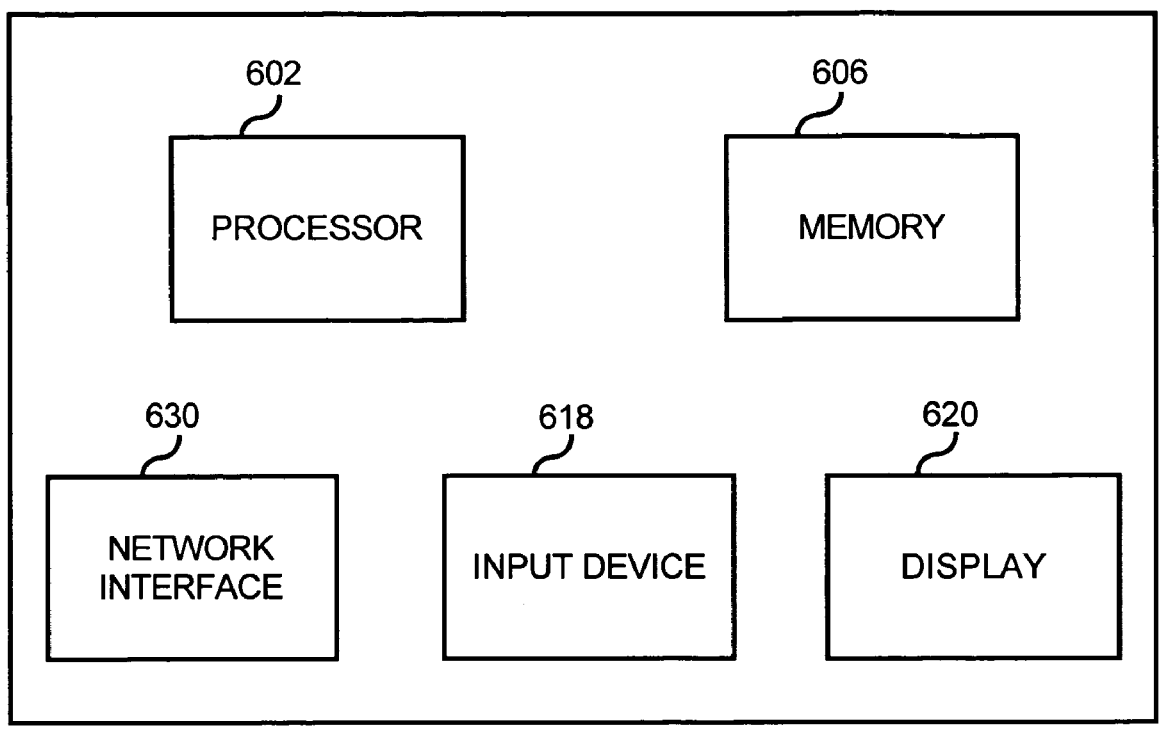
FIG. 6 is a block diagram illustrating a computer system operable to perform the methods depicted in FIGS. 4 and 5, according to an embodiment of the invention.

Referring to FIG. 6, and also with reference to FIG. 2, a schematic diagram of a computer system 600 is shown in accordance with an embodiment. The computer system 600 shown may be used as a server 220 in the system shown in FIG. 2. The computer system 600 may include one or more processors, such as processor 602, providing an execution platform for executing software. The computer system 600 also includes a memory 606, which may include Random Access Memory (RAM) where software is resident during runtime. Other types of memory such as ROM (read only memory), EPROM (erasable, programmable ROM), EEPROM (electrically erasable, programmable ROM) and data storage, such as hard disks, etc., may be used.

A user interfaces with the computer system 600 with one or more input devices 618, such as a keyboard, a mouse, a stylus, and the like and a display 620. A network interface 630 is provided for communicating with other computer systems. It will be apparent to one of ordinary skill in the art that FIG. 6 is meant to illustrate a generic computer system. Any type of computer system may be used. Furthermore, one or more components of the components of the computer system 600 are optional, such as the display and input devices, and other types of components may be used or substituted as is known in the art.

One or more of the steps of the operations shown in FIGS. 4 and 5 may be implemented as software embedded on a computer readable medium, such as the memory 606, and executed by the processor 602. The steps may be embodied by a computer program, which may exist in a variety of forms both active and inactive. For example, there may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

It will be apparent to one of ordinary skill in the art that other known electronic components may be added or substituted in the computer system 600. In addition, the computer system 600 may include a system board or blade used in a rack in a data center, a conventional "white box" server or computing device, etc. Also, one or more of the components in FIG. 6 may be optional (for instance, user input devices, secondary memory, etc.).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A system for distinguishing a package, said system comprising:
   a plurality of identifiers for the package, wherein at least one of the plurality of identifiers is intentionally non-functional and visible to the naked eye, and wherein non-functionality of the at least one of the plurality of identifiers is indistinguishable to the naked eye; and
   an identifier indicator that indicates the identity of the at least one of the plurality of identifiers that is intentionally non-functional, wherein the identifier indicator is stored on at least one of the package and a database, and wherein the identifier indicator is accessible by a user to authenticate the package.

2. The system according to claim 1, wherein the plurality of identifiers comprises at least one of a radio frequency identification device, a printed circuit, a bar code, and an ink mark.

3. The system according to claim 1, wherein the identifier indicator comprises a printed mark configured to be interpreted to identify the at least one of the plurality of identifiers that is intentionally non-functional.

4. The system according to claim 1, further comprising:
   a package indicator positioned on the package that substantially uniquely identifies the package.

5. The system according to claim 1, wherein a plurality of the identifiers are intentionally non-functional, wherein a difference between functional and non-functional identifiers is indistinguishable to the naked eye.

6. The system according to claim 1, wherein the package includes a plurality of sub-packages, and wherein the plurality of identifiers are associated with respective ones of the sub-packages, to thereby distinguish the package based upon which of the respective plurality of identifiers associated with the sub-packages are non-functional.

7. A method for distinguishing a package, the method comprising:
- providing identifiers with respect to the package, wherein at least one of the identifiers is intentionally non-functional and visible to the naked eye, and wherein non-functionality of the at least one of the identifiers is indistinguishable to the naked eye;
- identifying which of the identifiers is intentionally non-functional in an identifier indicator; and
- storing the identifier indicator.

8. The method according to claim 7, wherein providing identifiers further comprises providing a plurality of intentionally non-functional identifiers with respect to the package.

9. The method according to claim 7, wherein storing the identifier indicator further comprises storing the identifier indicator inn database with a package indicator configured to substantially uniquely identify the package.

10. The method according to claim 7, wherein storing the identifier indicator further comprises storing the identifier indicator on the package such that the identification of the intentionally non-functional at least one of the identifiers is capable of being determined through information provided from the identifier indicator located on the package.

11. The method according to claim 7, wherein the package includes a plurality of sub-packages, and wherein providing identifiers further comprises providing identifiers on the plurality of sub-packages, wherein at least one of the identifiers associated with respective ones of the sub-packages is intentionally non-functional.

12. A method for authenticating a package having identifiers, said method comprising:
- reading the identifiers;
- identifying from an identifier indicator which of the identifiers is intentionally non-functional and visible to the naked eye wherein non-functionality of the identifiers is indistinguishable to the naked eye;
- comparing the read identifiers with the identities of intentionally non-functional identifiers; and
- authenticating the package based upon the comparison of the read identifiers and the identities of the intentionally non-functional identifiers.

13. The method according to claim 12, further comprising:
- outputting an indication that the package is authentic in response to the identity of a non-functioning read identifier substantially matching the identity of an intentionally non-functional identifier.

14. The method according to claim 12, further comprising:
- outputting an indication that the package is in authentic in response to the identity of a non-functioning read identifier substantially differing from the identity of an intentionally non-functional identifier.

15. The method according to claim 12, wherein the identifier indicator is stored in a database, and wherein identifying which of the identifiers is intentionally non-functional further comprises accessing the database to retrieve the identity of the one or more identifiers that are intentionally non-functional.

16. The method according to claim 12, wherein the identifier indicator is stored on the package, and wherein identifying which of the identifiers is intentionally non-functional further comprises interpreting the identifier indicator to determine the identity of the one or more identifiers that are intentionally non-functional.

17. The method according to claim 12, wherein the package comprises a plurality of sub-packages having identifiers, and wherein reading the identifiers further comprises reading the identifiers of the sub-packages.

18. The method according to claim 17, wherein the identifier indicator includes information pertaining to a percentage of the identifiers of the sub-packages that are intentionally non-functional, and wherein authenticating the package comprises comparing the percentage of non-functional identifiers from the road identifiers with the percentage of the intentionally non-functional identifiers.

19. A system comprising:
- a plurality of means for storing information pertaining to a package, wherein at least one of the means for storing information is intentionally non-functional and visible to the naked eye, and wherein non-functionality of the at least one of the means for storing information is indistinguishable to the naked eye;
- means for identifying which of the means for storing information is intentionally non-functional; and
- means for storing the means for identifying.

* * * * *

UNITED STATES PATENT AND TRADEMARK OFFICE
CERTIFICATE OF CORRECTION

PATENT NO. : 7,466,234 B2
APPLICATION NO. : 11/264179
DATED : December 16, 2008
INVENTOR(S) : Simske et al.

It is certified that error appears in the above-identified patent and that said Letters Patent is hereby corrected as shown below:

In column 4, line 11, before "identifiers" delete "functional".

In column 6, lines 38-39, delete "in authentic" and insert -- inauthentic --, therefor.

In column 9, line 30, delete "in authentic" and insert -- inauthentic --, therefor.

In column 11, line 19, in Claim 9, delete "inn" and insert -- in a --, therefor.

In column 11, line 38, in Claim 12, delete "eye" and insert -- eye, --, therefor.

In column 12, line 7, in Claim 14, delete "in authentic" and insert -- inauthentic --, therefor.

In column 12, line 32, in Claim 18, delete "road" and insert -- read --, therefor.

Signed and Sealed this

Sixteenth Day of March, 2010

David J. Kappos
*Director of the United States Patent and Trademark Office*